United States Patent [19]

Rebhan

[11] Patent Number: 5,227,438
[45] Date of Patent: Jul. 13, 1993

[54] PROCESS FOR THE SLOWDOWN OR TERMINATION OF POLYMERIZATION

[75] Inventor: David M. Rebhan, Charleston, W. Va.

[73] Assignee: Union Carbide Chemicals & Plastics Technology Corporation, Danbury, Conn.

[21] Appl. No.: 764,843

[22] Filed: Sep. 24, 1991

[51] Int. Cl.$^5$ ............................ C08F 2/34; C08F 2/42; C08F 10/06
[52] U.S. Cl. ...................................... 526/82; 526/213; 526/351; 526/901
[58] Field of Search ................ 526/82, 213, 901, 351

[56] References Cited

U.S. PATENT DOCUMENTS 5,082,818  1/1992  Matsuura et al. .................... 526/125

FOREIGN PATENT DOCUMENTS 359444  3/1990  European Pat. Off. .
376559  7/1990  European Pat. Off. .
446059  9/1991  European Pat. Off. .

*Primary Examiner*—Joseph L. Schofer
*Assistant Examiner*—Tom Weber
*Attorney, Agent, or Firm*—Saul R. Bresch

[57] ABSTRACT

A process for terminating or retarding the rate of polymerization of propylene or a mixture comprising propylene and one or more other olefin monomers, in a gas phase reactor, in the presence of a catalyst system comprising (i) a solid catalyst precursor composition which includes magnesium, titanium, halogen, and carboxylic acid ester; (ii) hydrocarbyl aluminum cocatalyst; and (iii) a silicon compound containing at least one silicon-oxygen-carbon linkage, which comprises introducing a phthalate compound at a rate and in a sufficient quantity to substantially retard or terminate the said polymerization reaction.

26 Claims, No Drawings

PROCESS FOR THE SLOWDOWN OR TERMINATION OF POLYMERIZATION

TECHNICAL FIELD

This invention relates to a process for the slowdown or termination of polymerization through the use of a kill agent.

BACKGROUND INFORMATION

In U.S. patent application Ser. No. 051,853 filed on May 19, 1987, now U.S. Pat. No. 5,093,415 a process is provided for producing stereoregular polymers. More particularly, it was found that polymers having an isotactic index of at least 96 percent could be prepared in high yield at high production rates by polymerizing an alpha-olefin in a low pressure gas phase fluidized bed process at temperatures in excess of 50° C. employing a catalyst system comprising (i) a solid catalyst precursor, which includes magnesium, titanium, halogen, and an inside electron donor, i.e., a polycarboxylic acid ester containing two coplanar ester groups attached to adjacent carbon atoms; (ii) a hydrocarbylaluminum cocatalyst; and (iii) an outside electron donor or selectivity control agent, i.e., a silicon compound containing a silicon-oxygen-carbon linkage wherein the atomic ratio of aluminum to silicon is in the range of about 0.5:1 to about 100:1 and the atomic ratio of aluminum to titanium is in the range of about 5:1 to about 300:1.

This catalyst system can be used to provide homopolymers of propylene and copolymers of propylene and one or more alpha-olefins. The high activity at temperatures in the range of about 50° C. to about 110° C., which makes this catalyst system so attractive, is also responsible for a negative characteristic. This deficiency exhibits itself in the form of a kinetic profile, which can be described as "autoacceleration", and leads to processes, which are, in effect, out of control; processes in which the reactants are "over reactive"; agglomeration of particular product; and other various undesirable results such as hot spotting, chunking, and sheeting.

Autoacceleration can be defined as an abrupt increase in the reaction rate of a process to an undesirable level due to a sudden rise in temperature. In effect, the system is unable to remove the heat as fast as it is generated. Control of this behavior is essential for the smooth operation of the process in the reactor. Also, in the event of downstream process upsets, e.g., purge bin pluggage or extruder failure, it is desirable to quickly slow the polymerization rate to keep the reactor(s) or purge bin from overfilling with resin.

This can be accomplished by introducing a kill agent such as carbon monoxide into the polymerization reactor; however, carbon monoxide and similar kill agents require the purging of the reactor gases before the polymerization process can be restarted.

It would be advantageous to provide a kill agent, which not only avoids the problem of purging, but is at least partially reversible, and can also be used to minimize off-grade resin production. A reversible kill agent can be defined as a chemical which, when added to the polymerization reactor, results in a dramatic decrease in propagation rate (slow down in the rate of polymerization) without affecting the catalyst decay, with the stipulation that the polymerization can be restarted easily. A partially reversible kill agent is one in which there is an increase in the catalyst decay rate even though there is a decrease in monomer propagation rate. Again, the polymerization can be restarted without difficulty.

DISCLOSURE OF THE INVENTION

An object of this invention, therefore, is to provide a process for decreasing the rate of polymerization with a kill agent which is at least partially reversible.

Other objects and advantages will become apparent hereinafter.

According to the present invention, a process for decreasing the rate of polymerization has been discovered comprising:

(a) contacting propylene or a mixture comprising propylene and one or more other alpha-olefins in the gas phase in one or more reaction zones, under polymerization conditions, with a catalyst system comprising (i) a solid catalyst precursor, which includes magnesium; titanium; a halogen which is chlorine, bromine, or iodine, or mixtures thereof; and a mono- or polycarboxylic acid ester; (ii) a hydrocarbylaluminum cocatalyst; and (iii) a silicon compound containing at least one silicon-oxygen-carbon linkage; and (b) introducing a phthalate compound into the reaction zones in an amount sufficient to decrease the rate of polymerization.

DESCRIPTION OF THE PREFERRED EMBODIMENT(S)

The solid catalyst precursor, a complex, can be prepared by halogenating a magnesium compound of the formula MgRR' wherein R is an alkoxide or aryloxide group and R' is an alkoxide or aryloxide group or a halogen with a halogenated tetravalent titanium compound containing at least two halogen atoms in the presence of a halohydrocarbon and a monocarboxylic acid ester or polycarboxylic acid ester containing two coplanar ester groups attached to adjacent carbon atoms. The alkoxide groups can contain 1 to 8 carbon atoms and the aryloxide groups 6 to 10 carbon atoms. The halogen can be chlorine, bromine, or iodine.

Suitable magnesium compounds are magnesium diethoxide, magnesium diisopropoxide, magnesium di-n-butoxide, magnesium diphenoxide, magnesium dinaphthoxide, ethoxy magnesium isobutoxide, ethoxy magnesium phenoxide, naphthoxy magnesium isoamyloxide, ethoxy magnesium bromide, isobutoxy magnesium chloride, phenoxy magnesium iodide, cumyloxy magnesium bromide, and naphthoxy magnesium chloride.

The halogenated tetravalent titanium compound contains at least two halogen atoms and can have up to two alkoxy and/or aryloxy groups. Examples are $TiCl_4$, $TiBr_4$, diethoxy titanium dibromide, isopropoxy titanium triiodide, dihexoxy titanium dichloride, and phenoxy titanium trichloride.

The halohydrocarbon, while preferably aromatic, can be aliphatic or alicyclic. Suitable halohydrocarbons are chlorobenzene, bromobenzene, dichlorobenzene, dichlorodibromobenzene, chlorotoluene, dichlorotoluene, chloronaphthalene, dibromomethane, trichloromethane, 1,2-dichloroethane, trichloroethane, dichlorofluoroethane, hexachloroethane, trichloropropane, chlorobutane, dichlorobutane, chloropentane, trichlorofluorooctane, tetrachloroisooctane, dibromodifluorodecane, dibromocyclobutane, and trichlorocyclohexane.

The halogenated tetravalent titanium compound and the halohydrocarbon preferably contain no more than 12 carbon atoms.

Suitable polycarboxylic acid esters can be characterized by a molecularly rigid structure wherein two ester groups are attached to adjacent carbon atoms of the molecule and lie in a single plane. Such esters include polycarboxylic acid esters containing two ester groups which are attached to (a) ortho carbon atoms of a monocyclic or polycyclic aromatic ring, each of said ester groups being further linked to a branched or unbranched chain hydrocarbon radical; (b) vicinal carbon atoms of a non-aromatic monocyclic or polycyclic ring and which lie in a syn configuration with respect to each other, each of said ester groups being further linked to a branched or unbranched chain hydrocarbon radical; or (c) vicinal double bonded carbon atoms of an unsaturated aliphatic compound and which lie in a syn configuration with respect to each other, each of said ester groups being further linked to a branched or unbranched chain hydrocarbon radical.

These polycarboxylic acid esters can be derived from a suitable polycarboxylic acid and a monohydric alcohol having a linear hydrocarbon moiety which may be branched or unbranched. Examples of polycarboxylic acid esters are dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amyl phthalate, dineopentyl phthalate, di-2-ethylhexyl phthalate, di-2-ethyldecyl phthalate, diethyl-1,2-fluorenedicarboxylate, diisopropyl-1-,2-ferrocenedicarboxylate, cis-diisobutyl-cyclobutane-1,2-dicarboxylate, endo-diisobutyl-5-norbornene-2,3-dicarboxylate, endo-diisobutyl-bicyclo[2.2.2]oct-5-ene-2-3-dicarboxylate, diisobutyl maleate, and diisoamyl citraconate. The phthalate compounds are also suitable for use as kill agents in step (b) of subject process, i.e., these compounds can be used to decrease the rate of polymerization.

Examples of monocarboxylic acid esters, which can be used as the inside electron donor are as follows: ethyl and methyl benzoate, p-methoxy ethyl benzoate, p-ethoxy methyl benzoate, p-ethoxy ethyl benzoate, ethyl acrylate, methyl methacrylate, ethyl acetate, p-chloro ethyl benzoate, p-amino hexyl benzoate, isopropyl naphthenate, n-amyl toluate, ethyl cyclohexanoate and propyl pivalate.

Halogenation of the magnesium compound is effected employing an excess of titanium compound, about 2 mols to about 100 mols of titanium compound per mole of magnesium compound. The halohydrocarbon is employed in an amount sufficient to dissolve the titanium compound and the ester, and to adequately disperse the solid, insoluble magnesium compound. The magnesium compound can be used in an amount of about 0.005 to 2.0 mols of magnesium compound per mol of halohydrocarbon and the ester in an amount of about 0.0005 to about 2.0 mols of ester per mol of titanium compound. The halogenation of the magnesium compound can be carried out in a temperature range of about 60° C. to about 150° C. over a period of about 0.1 to about 6 hours. The halogenated product is a solid material which can be isolated from the liquid reaction medium by filtration or decantation. After separation, it is treated one or more times with the titanium compound in the same molar ratio to remove residuals and maximize catalyst activity. The halohydrocarbon is usually employed during this treatment to dissolve the titanium compound and disperse the halogenated product. The treatment is preferably carried out twice, the second treatment being in the presence of a polycarboxylic acid halide containing two coplanar acid groups attached to adjacent carbon atoms where the electron donor is a polycarboxylic acid ester. About 5 to about 200 millimols of acid halide are generally employed per gram atom of magnesium. Suitable acid halides include phthaloyl dichloride, 2,3-naphthalene di-carboxylic acid dichloride, endo-5-norbornene-2,3-dicarboxylic acid dichloride, maleic acid dichloride, and citraconic acid dichloride.

After the solid halogenated product has been treated one or more times with additional halogenated tetravalent titanium compound, it is separated from the liquid reaction medium, washed with an inert hydrocarbon to remove unreacted titanium compounds, and dried. The final washed product suitably has a titanium content of about 0.5 percent by weight to about 6.0 percent by weight. The atomic ratio of titanium to magnesium in the final product is in the range of about 0.01:1 to about 0.2:1. The mono- or polycarboxylic acid ester can be present in the solid catalyst precursor in a molar ratio of ester to magnesium of about 0.005:1 to about 10:1.

The hydrocarbyl aluminum cocatalyst can be represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be alike or different; and each R, which is a hydrocarbyl radical, has 1 to 20 carbon atoms, and preferably 1 to 10 carbon atoms. Further, each alkyl radical can be straight or branched chain and such hydrocarbyl radical can be a mixed radical, i.e., the radical can contain alkyl, aryl, and/or cycloalkyl groups. Examples of suitable radicals are: methyl, ethyl, propyl, isopropyl, butyl, isobutyl, tert-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, dodecyl, phenyl, phenethyl, methoxyphenyl, benzyl, tolyl, xylyl, naphthyl, naphthal, methylnaphthyl, cyclohexyl, cycloheptyl, and cyclooctyl.

Examples of suitable hydrocarbyl aluminum compounds are as follows: triisobutylaluminum, trihexylaluminum, di-isobutylaluminum hydride, dihexylaluminum hydride, isobutylaluminum dihydride, hexylaluminum dihydride, di-isobutylhexylaluminum, isobutyl dihexylaluminum, trimethylaluminum, treithylaluminum, tripropyaluminum, triisopropyaluminum, tri-n-butylaluminum, trioctylaluminum, tridecylaluminum, tridodecylaluminum, tribenzylaluminum, triphenylaluminum, trinaphthylaluminum, and tritolylaluminum. The preferred hydrocarbyl aluminums are triethylaluminum, triisobutylaluminum, trihexylaluminum, di-isobutylaluminum hydride, and dihexylaluminum hydride.

The silicon compounds include compounds having the formula $R_aSiY_bX_c$ wherein R is a hydrocarbon radical having 1 to 20 carbon atoms; Y is —OR or —OCOR; and X is hydrogen, chlorine, bromine, or iodine; each R and Y are the same or different; a is an integer from 0 to 3; b is an integer from 1 to 4; c is 0 or 1; and $a+b+c=4$. R can be substituted or unsubstituted. Silicon compounds containing Si—O—Si groups can also be employed providing that at least one Si—O—C group is present. Examples of useful silicon compounds are diphenyldimethoxysilane, n-propyltrimethoxysilane, di-tert-butyldimethoxysilane, diphenyldiisobutoxysilane, diisobutyldimethoxysilane, and dimethyldiethoxysilane.

The polymer is prepared in the gas phase, generally, by continuously contacting the catalyst system described above with propylene or a mixture of comonomers comprising propylene and one or more other alpha-olefins in one or more fluidized bed reactors such as that described in U.S. Pat. No. 4,482,687 or another conventional reactor for the gas phase production of, for example propylene homopolymers or copolymers.

In this specification, the term "copolymer" is considered to mean a polymer based on two or more comonomers. The alpha-olefin comonomers referred to above can have 2 or 4 to 12 carbon atoms. Additional comonomers such as conjugated or non-conjugated dienes containing 5 to 25 carbon atoms can also be included in the mixture of comonomers to be polymerized. Useful alpha-olefins preferably do not contain any branching on carbon atoms closer than two carbon atoms removed from the double bond. Examples of suitable alpha-olefins include ethylene, 1-butene, 1-hexene, 4-methylpentene-1, 1-heptene, and 1-octene. Examples of the dienes are 1,4-pentadiene, 1,4-hexadiene, 1,5-hexadiene, dicylcopentadiene, cyclohexadiene, 1-vinyl-1-1-cyclopentene, and the alkylbicyclononadienes, indenes, and norbornenes. Ethylidene norbornene is an example of the latter. The non-conjugated dienes are preferred.

In the copolymer, the portion attributed to propylene can be in the range of about 80 to about 99.5 percent by weight based on the weight of the copolymer and is preferably in the range of about 90 to about 99.5 percent by weight; the portion attributed to the second comonomer can be in the range of about 0.5 to about 20 percent by weight and is preferably in the range of about 0.5 to about 10 percent by weight; and the portion attributed to other comonomers, if any, can be in the range of about 0.5 to about 20 percent by weight. All percentages are based on the weight of the copolymer.

The fluidized bed, or other gas phase, reactor can be operated at a temperature in the range of about 50° C. to about 150° C. and is preferably operated at a temperature in the range of about 60° C. to about 90° C. The operating pressure can be in the range of about 200 psig to about 650 psig or higher and is preferably about 250 psig to about 550 psig. The partial pressure of the propylene can be in the range of about 50 to about 600 psi and is preferably about 150 to about 500 psi. The partial pressure of the second comonomer can be in the range of about 0.25 to about 25 psi and is preferably about 1 to about 15 psi. The total partial pressure of other comonomers can be about 0.5 to about 75 psi. The superficial gas velocity, which can be calculated by measuring cycle gas flow, is, generally, maintained in the range of about 0.1 to about 5 feet per second and is preferably in the range of about 0.5 to about 3 feet per second. The superficial gas velocity is preferably used together with a slow transition in order to optimize the results.

The residence time of the alpha-olefin(s) in the reactor can be in the range of about 1 to about 20 hours and is preferably in the range of about 2 to about 6 hours. The velocity of the fluidizing gas can be in the range of about 0.1 to about 5.0 feet per second or higher and is preferably about 0.5 to about 2.0 feet per second. Hydrogen or another chain transfer agent can be used in the process. The molar ratio of hydrogen to alpha-olefin used in the fluidized bed reactor can be in the range of about 0.0005:1 to about 0.2:1 and is preferably in the range of about 0.01:1 to about 0.1:1. This translates into a hydrogen partial pressure in the range of about 0.1 psi to about 200 psi and preferably about 0.5 psi to about 50 psi. The balance of the operating pressure utilized in the reactor, i.e., after the partial pressure of propylene, other comonomers, and the hydrogen partial pressure are considered, can be made up by using an inert gas such as nitrogen.

Where it is desired to produce random copolymers, one fluidized bed reactor will suffice. In the case of impact grade copolymers, a second fluidized bed is needed.

The atomic or molar ratios of catalyst components can be about as follows:

| Ratio | Broad Range | Preferred Range |
|---|---|---|
| Mg to Ti | 1:1 to 50:1 | 3:1 to 30:1 |
| Halogen to Mg | 1.1 to 5:1 | 2:1 to 3:1 |
| Mg to inside electron donor | 0.1:1 to 100:1 | 1:1 to 60:1 |
| Al to Ti | 5:1 to 300:1 | 10:1 to 200:1 |
| Al to selectivity control agent (SCA) | 0.5:1 to 50:1 | 1:1 to 20:1 |

As noted above, the kill agent is a phthalate compound, which is introduced into the polymerization reactor when it is desired to slow down the polymerization rate or terminate the polymerization. A sufficient amount of phthalate compound is used to accomplish the desired slowdown. The rate of introduction is selected to accomplish the same end. It is preferred to add all of the kill agent at one time, but the kill agent can also be introduced incrementally in order to gradually slow the reaction. The amount can be in the range of about 50 to about 500 ppmw (parts per million by weight) based on one million parts by weight of polymer product, and is preferably in the range of about 75 to about 300 ppmw. These ranges cover slowdown to essentially complete termination of the polymerization over a period of time ranging from about one half hour to about 2 hours. In order to essentially terminate polymerization in about one half to one hour, the preferred amount of phthalate compound is in the range of about 150 to about 300 ppmw based on one million parts by weight of polymer. It is best, in this instance, to add the phthalate compound in excess. The phthalate compound is preferably a dialkyl phthalate wherein each alkyl independently can have 1 to 10 carbon atoms and preferably has 1 to 6 carbon atoms. The phthalate compound can be introduced at any time during the polymerization. Preferred phthalate compounds are diisobutyl phthalate (DIBPH) and diethyl phthalate (DEPH). Other suitable phthalate compounds are mentioned above.

In order to restart the polymerization, catalyst precursor, cocatalyst and/or selectivity control agent are added to the reactor in about the following parts by weight based on one million parts by weight of polymer:

| | Broad Range | Preferred Range |
|---|---|---|
| catalyst precursor | 0 to 100 | 0 to 50 |
| cocatalyst | 50 to 500 | 75 to 300 |
| selectivity control agent | 0 to 500 | 3 to 200 |

It is noted that the phthalate compound acts like a selectivity control agent on resin properties in that it decreases xylene solubles and decreases the hydrogen chain transfer rate. DIBPH, particularly, is non-toxic and stable so it is safe to add this material to the resin in small quantities.

The patents and patent application mentioned in this specification are incorporated by reference herein.

The invention is illustrated by the following examples.

EXAMPLES 1 TO 4

To a solution of 70 milliliters of titanium tetrachloride (120 grams, 0.64 mol) in 3.7 liters of chlorobenzene are added, in succession, 180 milliliters of diisobutyl phthalate (187 grams, 0.67 mol), 590 grams (5.2 mols) of magnesium diethoxide, and a solution of 4.7 liters of titanium tetrachloride (8100 grams, 43 mols) in 1.2 liters of chlorobenzene. A temperature of 20° C. to 25° C. is maintained during these additions. The resulting mixture is then heated to 110° C. with stirring, the temperature being maintained for 1 hour. At the end of this time, the mixture is filtered while hot. A solid material is collected.

The solid material is then slurried in a solution of 4.7 liters of titanium tetrachloride (8100 grams, 43 mols) in 1.2 liters of chlorobenzene at room temperature. A solution of 45 grams (0.22 mol) of phthaloyl dichloride in 3.7 liters of chlorobenzene is added to the slurry at room temperature, and the resulting slurry is then heated to 110° C. with stirring, the temperature being maintained for 30 minutes. At the end of this time, the mixture is filtered while hot. A solid material is collected.

The solid material is reslurried in a solution of 4.7 liters of titanium tetrachloride (8100 grams, 43 mols) in 1.2 liters of chlorobenzene at room temperature. An additional 3.7 liters of chlorobenzene is then added to the slurry at room temperature, and the resulting slurry is heated to 110° C. with stirring, the temperature being maintained for 30 minutes. At the end of this time the mixture is filtered while hot. A solid material is collected.

The solid material is reslurried once again in a solution of 4.7 liters of titanium tetrachloride (8100 grams, 43 mols) in 1.2 liters of chlorobenzene at room temperature. An additional 3.2 liters of chlorobenzene is then added to the slurry at room temperature, and the resulting slurry is heated to 110° C. with stirring, the temperature being maintained for 30 minutes. At the end of this time, the mixture is filtered while hot. The residue is washed 6 times with 500 milliliter portions of hexane at 25° C., and then dried under a nitrogen purge. The product weighs about 500 grams. This is the solid catalyst precursor.

The solid catalyst precursor is continuously fed into a fluidized bed reactor as a 30 percent by weight dispersion in mineral oil. Simultaneously, and continuously, triethylaluminum cocatalyst (TEAL), n-propyltrimethoxysilane (NPTMS) selectivity control agent (SCA), and, in examples 2, 3, and 4, diisobutyl phthalate (DIBPH) are added to the reactor (all as dilute solutions in isopentane).

Propylene, hydrogen, and nitrogen are added to maintain a specified total pressure. The total pressure and partial pressure of propylene are mentioned in the Table as well as the hydrogen/propylene molar ratio.

The balance of the total pressure is made up with nitrogen. The gas feed is accomplished through the use of a syringe continuous feeder. The resin product is transferred from the fluidized bed to a purge bin in which the resin flows downward by gravity and humidified nitrogen flows upward so that the contained moisture can deactivate the catalyst components in the resin to reduce odor.

The reactor is a pilot scale model, 14 inches in diameter and 28 feet in height.

EXAMPLES 5 AND 7

These examples are carried out in the same manner as Examples 1 to 4 except that DIBPH is omitted.

EXAMPLE 6

This example is a bed accumulation test carried out in the absence of DIBPH.

The test is performed, after reaching steady state reaction operation, on the homopolymer product. Then, the product discharge system is shut off as well as the catalyst, TEAL, and NPTMS feeds. This, in essence, turns the reactor into a fluidized batch reactor. The bed is allowed to react in the batch mode at constant gas phase conditions for about 4 hours. By measuring the amount of resin accumulation over time, a measure of the catalyst decay rate is obtained.

EXAMPLES 8 TO 11

Example 8 is a bed accumulation test (BAT) to determine the effect of DIBPH, as a kill agent, on reaction rate, catalyst deactivation, and reactor operability. The test is performed, after reaching steady state reactor operation, on the homopolymer product. Then, the product discharge system is shut off as well as the catalyst, TEAL, and NPTMS feeds. This, in essence, turns the reactor into a fluidized batch reactor. At this point, DIBPH is bombed into the bed under nitrogen pressure. Then, the bed is allowed to react in the batch mode at constant gas phase conditions for about 4 hours. By comparing the amount of accumulation over time, with and without DIBPH addition, an estimate of kill agent effectiveness is obtained. Note that from Example 6 to Example 8, resin accumulation drops from 115 pounds to 10 pounds, an 11.5 fold decrease.

Because of experimental difficulties associated with the BAT test, results are approximations.

After deactivating the catalyst in example 8, a determination is made of the reversibility of the kill agent, i.e., the DIBPH. This is accomplished by injecting TEAL into the reactor after the conclusion of example 8, but while the reactor is still operating as a fluidized batch reactor. Resin weight gain is monitored with time. This gives an estimate of the ease and the extent of catalyst reactivation. Variables and results are set forth in the Table.

Note: The values of 200.0 in each of the examples represents 200.00 cubic centimeters. Each addition of 200.0 cubic centimeters is made all at once rather than per hour. The addition in example 8 is made at the beginning of the BAT; the addition in example 9 is made at the fourth hour of the BAT; the addition in example 10 is made at the fifth hour of the BAT; and the addition in example 11 is made at the eighth hour of the BAT.

TABLE

Example

TABLE-continued

|  | 1 | 2 | 3 | 4 | 5 | 6 |
|---|---|---|---|---|---|---|
| Reaction Conditions: | | | | | | |
| Reactor pressure (psig) | 425.0 | 425.0 | 425.0 | 425.0 | 425.0 | 425.0 |
| Propylene partial pressure (psig) | 338.7 | 340.8 | 338.0 | 343.8 | 340.0 | 347.0 |
| Reactor temperature (°C.) | 65.0 | 65.0 | 65.0 | 65.0 | 65.0 | 65.0 |
| $H_2/C_3$ molar ratio | 0.0032 | 0.0033 | 0.0036 | 0.0040 | 0.003 | 0.0029 |
| Average residence time (hrs) | 1.94 | 2.20 | 2.89 | 3.62 | 1.79 | BAT |
| Resin bed weight (lbs) | 80 | 80 | 80 | 80 | 70 | Accumulated |
| Recycle gas velocity (ft/sec) | 1.04 | 1.04 | 1.04 | 1.03 | 1.20 | 1.20 |
| 5 wt % TEAL in isopentane (flow rate in cc/hr) | 99.6 | 100.0 | 107.2 | 142.4 | 234 | 0 |
| 1 wt % NPTMS in isopentane (flow rate in cc/hr) | 90.2 | 89.3 | 98.0 | 130.9 | 302 | 0 |
| 2 wt % DIBPH in isopentane (flow rate in cc/hr) | 0 | 61.9 | 100.4 | 213 | 0 | |
| NPTMS/DIBPH molar ratio | | 1.22 | 0.83 | 0.52 | | |
| NPTMS/total SCA molar ratio | 1.00 | 0.55 | 0.45 | 0.34 | | |
| TEAL/NPTMS molar ratio | 7.94 | 8.06 | 7.87 | 7.83 | 3.10 | 0 |
| TEAL/DIBPH molar ratio | | 9.85 | 6.51 | 4.07 | | |
| TEAL/total SCA molar ratio | 7.94 | 4.43 | 3.56 | 2.68 | | |
| Al/Ti atomic ratio | 45.26 | 39.00 | 47.98 | 39.03 | 41.47 | |
| NPTMS/Ti molar ratio | 5.70 | 4.84 | 6.10 | 4.99 | 13.39 | |
| DIBPH/Ti molar ratio | 0 | 3.96 | 7.37 | 9.58 | | |
| Resin Properties: | | | | | | |
| Melt flow | 1.89 | 1.7 | 2.3 | 2 | 2.1 | |
| Xylene solubles (%) | 3.07 | 1.94 | 2.12 | 1.76 | 2.4 | 2.5 |
| Ti (ppm) | 1.55 | 2.05 | 2.35 | 4.80 | 2.1 | 1.1 |
| Productivity (kg polymer/gm Ti) | 645.2 | 487.8 | 425.5 | 208.3 | 476.19 | 909.9 |
| Normalized Ti (ppm) | 1.4 | 1.9 | 2.5 | 5.8 | 1.76 | |
| Normalized productivity (kg polymer/gm cat) | 20.64 | 14.47 | 11.10 | 4.85 | | |
| ppm Al in resin by weight | 39.5 | 45.1 | 63.6 | 105.1 | 207.59 | |
| ppm DIBPH in resin by weight | 0 | 47 | 101 | 267 | | |
| ppm NPTMS in resin by weight | 30 | 34 | 49 | 82 | 96.45 | |
| Settled bulk density (lbs/cu ft) | 25.4 | 26.9 | 27.02 | 26.2 | 23.39 | 24.4 |
| Accumulation over time (in lbs and hrs) | | | | | | about 115 lbs accumulated over 4 hrs |

|  | Example | | | | |
|---|---|---|---|---|---|
|  | 7 | 8 | 9 | 10 | 11 |
| Reaction Conditions: | | | | | |
| Reactor pressure (psig) | 425.0 | | | | |
| Propylene partial pressure (psig) | 339.0 | | | | |
| Reactor temperature (°C.) | 65.0 | | | | |
| $H_2/C_3$ molar ratio | 0.00305 | | | | |
| Average residence time (hrs) | 1.58 | | | | |
| Resin bed weight (lbs) | 70 | 80.3 | 82.3 | 122.3 | 198 |
| Recycle gas velocity (ft/sec) | 1.04 | | | | |
| 5 wt % TEAL in isopentane (flow rate in cc/hr) | 89.5 | | 200.0 | 200.0 | 200.0 |
| 1 wt % NPTMS in isopentane (flow rate in cc/hr) | 65.6 | | 0 | 0 | 0 |
| 2 wt % DIBPH in isopentane (flow rate in cc/hr) | 0 | 200.0 | | | |
| NPTMS/DIBPH molar ratio | | | | | |
| NPTMS/total SCA molar ratio | | | | | |
| TEAL/NPTMS molar ratio | 9.82 | 9.82 | 23.7 | 37.6 | 51.5 |
| TEAL/DIBPH molar ratio | | 1.72 | 4.16 | 6.60 | 9.04 |
| TEAL/total SCA molar ratio | | 1.47 | 3.54 | 5.61 | 7.69 |
| Al/Ti atomic ratio | 32.31 | | | | |
| NPTMS/Ti molar ratio | 3.29 | | | | |
| DIBPH/Ti molar ratio | | 19.34 | | | |
| Resin Properties: | | | | | |
| Melt flow | 3.1 | | | | |
| Xylene solubles (%) | 3.44 | | | | 22 |
| Ti (ppm) | 1.82 | | | | 0.4 |
| Productivity (kg polymer/gm Ti) | 549.5 | | | | 2500.00 |
| Normalized Ti (ppm) | 1.41 | | | | |
| Normalized productivity (kg polymer/gm cat) | | | | | |
| ppm Al in resin by weight | 33.15 | 27.7 | 68.6 | 109 | 98 |
| ppm DIBPH in resin by weight | 0 | 204.53 | 169.00 | 166.00 | 110.00 |
| ppm NPTMS in resin by weight | 20.55 | 20.55 | 17 | 16.7 | 11 |
| Settled bulk density (lbs/cu ft) | | | | | |
| Accumulation over time (in lbs and hrs) | | about 10 lbs accumulated | about 2 lbs accumulated | about 40 lbs accumulated | about 75 lbs accumulated |

TABLE-continued

|  |  |  |  |
|---|---|---|---|
| over 4 hrs | over 1 hr | over 3 hrs | over 9 hrs |

Notes to Table:
1. $H_2/C_3$ molar ratio = hydrogen/propylene molar ratio.
2. 5 wt % TEAL in isopentane = a 5 percent by weight solution of triethylaluminum (TEAL) in isopentane based on the weight of the total solution.
3. 1 wt % NPTMS in isopentane = a one percent by weight solution of n-propyltrimethoxysilane (NPTMS) in isopentane based on the weight of the total solution.
4. 2 wt % DIBPH in isopentane = a two percent by weight solution of diisobutyl phthalate in isopentane based on the weight of the total solution.
5. Total SCA = total selectivity control agent, i.e., NPTMS plus DIBPH.
6. Melt flow is determined under ASTM D-1238, Condition L, measured at 230° C. with a 2160 gram load, and reported as grams per 10 minutes (g/10 min).
7. Xylene solubles are the percent by weight of resin that stays in solution after the resin sample is dissolved in hot xylene and the solution is allowed to cool to 23° C.
8. Ti (ppm): in examples 1 to 4, Ti (ppm) is determined by X-ray fluorescence, and in examples 5 to 9, Ti (ppm) is determined by UV spectrophotometry.
9. Normalized Ti (ppm): in examples 1 to 5 and 7, the Ti in normalized to 2 hours average residence time and 380 psi propylene.
10. Normalized productivity (kg polymer/gm cat): in examples 1 to 4, the productivity is normalized to 2 hours average residence time and 380 psi propylene.
11. Settled bulk density is determined as follows: a resin sample of a fixed volume is collected and weighed. Bulk density is calculated by dividing the weight by the volume.
12. Accumulation over time (in pounds and hours): This provides an estimate of the slowdown in example 6 and of reactivation in examples 7 to 9 in terms of the pounds of resin accumulated in a fixed period of time.

I claim:

1. A process for terminating or retarding the rate of polymerization of propylene or a mixture comprising propylene and one or more other olefin monomers, in a gas phase reactor in the presence of a catalyst system comprising (i) a solid catalyst precursor composition consisting of a complex, which includes magnesium, titanium, halogen, and, as an inside electron donor, a carboxylic acid ester; (ii) hydrocarbyl aluminum cocatalyst; and (iii) a silicon compound containing at least one silicon-oxygen-carbon linkage, which comprises introducing a phthalate compound, independent of the said complex, into the reactor at a rate and in a sufficient quantity to substantially retard or terminate the said polymerization reaction.

2. The process defined in claim 1 wherein said phthalate compound is introduced into said reactor in an amount ranging from about 50 ppmw to about 500 ppmw per million parts of polymer present in said reactor over a period of time ranging from about one-half hour to about two hours.

3. The process defined in claim 1 wherein, after the introduction of said phthalate is complete, hydrocarbyl aluminum cocatalyst is introduced into the reactor in a amount sufficient to increase the rate of said polymerization.

4. A process for terminating polymerization of propylene or a mixture comprising propylene and one or more other olefin monomers, in a gas phase reactor, in the presence of a catalyst system comprising (i) a solid catalyst precursor composition consisting of a complex, which includes magnesium, titanium, halogen, and, as an inside electron donor, a carboxylic acid ester; (ii) hydrocarbyl aluminum cocatalyst; and (iii) a silicon compound containing at least one silicon-oxygen-carbon linkage, which comprises introducing a phthalate compound, independent of the said complex, into the reactor at ar ate and in a sufficient quantity to terminate the said polymerization reaction.

5. The process defined in claim 4 wherein said phthalate compound is introduced into said reactor in an amount ranging from about 50 ppmw to about 500 ppmw per million parts of polymer present in said reactor over a period of time ranging from about one-half hour to about two hours.

6. The process defined in claim 5 wherein the phthalate compound is introduced in an amount of about 75 to about 300 parts per million by weight.

7. The process defined in claim 4 wherein the phthalate compound is a dialkyl phthalate wherein each alkyl independently has 1 to 10 carbon atoms.

8. The process defined in claim 7 wherein the dialkyl phthalate is diisobutyl phthalate or diethyl phthalate.

9. A process comprising
 (a) contacting propylene or a mixture comprising propylene and one or more other alpha-olefins in the gas phase in one or more reaction zones, under polymerization conditions, with a catalyst system comprising (i) a solid catalyst precursor consisting of a complex, which includes magnesium; titanium; a halogen which is chlorine, bromine, or iodine, or mixtures thereof; and, as an inside electron donor, a mono- or polycarboxylic acid ester; (ii) a hydrocarbyl aluminum cocatalyst; and (iii) a silicon compound containing at least one silicon-oxygen-carbon linkage; ad
 (b) introducing a phthalate compound, independent of the said complex, into the reaction zones in an amount sufficient to decrease the rate of polymerization.

10. The process defined in claim 9 wherein the phthalate compound is introduced in an amount sufficient to essentially terminate polymerization.

11. The process defined in claim 9 wherein the phthalate compound is introduced in an amount of about 50 to about 500 parts per million by weight based on one million parts by weight of polymer.

12. The process defined in claim 11 wherein the phthalate compound is introduced in an amount of about 75 to about 300 parts per million by weight.

13. The process defined in claim 9 wherein the phthalate compound is a dialkyl phthalate wherein each alkyl independently has 1 to 10 carbon atoms.

14. The process defined in claim 13 wherein the dialkyl phthalate is diisobutyl phthalate or diethyl phthalate.

15. The process defined in claim 9 carried out under about the following conditions:
 (i) temperature: 55° C. to 110° C.;
 (ii) atomic ratio of aluminum to titanium: 20 to 200;
 (iii) molar ratio of aluminum to silicon compound: 2 to 50; and
 (iv) propylene partial pressure: 50 to 450 psi.

16. The process defined in claim 9 wherein the process is carried out continuously and one or more of the reaction zones are fluidized beds.

17. The process defined in claim 9 wherein the acid ester is a polycarboxylic acid ester containing two coplanar ester groups attached to adjacent carbon atoms.

18. The process defined in claim 9 wherein the hydrocarbyl aluminum cocatalyst is a trialkylaluminum.

19. The process defined in claim 9 wherein the silicon compound has the formula:

$R_a SiY_b X_c$ wherein R is a hydrocarbon radical having 1 to 20 carbon atoms; Y is —OR or —OCOR; and X is hydrogen, chlorine, bromine, or iodine; each R and Y are the same or different; a is an integer from 0 to 3; b is an integer from 1 to 4; c is o or 1; and a+b+c=4.

20. The process defined in claim 9 wherein, after step (b), a hydrocarbyl aluminum cocatalyst is introduced into the reaction zones in an amount sufficient to increase the rate of polymerization.

21. The process defined in claim 20 wherein the amount of cocatalyst is sufficient to essentially restore the initial rate of polymerization.

22. The process defined in claim 9 wherein, after step (b), catalyst precursor or selectivity control agent are introduced into the reaction zones in an amount sufficient to increase the rate of polymerization.

23. The process defined in claim 20 wherein, after step (b), the hydrocarbyl aluminum cocatalyst is introduced into the reaction zones in an amount of about 50 to about 500 parts by weight based on one million parts by weight of polymer.

24. The process defined in claim 9 wherein the silicon compound is an alkyltrialkoxysilane or a dialkyldialkoxysilane.

25. A process comprising (a) contacting propylene or a mixture comprising propylene and one or more other alpha-olefins in the gas phase in one or more fluidized bed reactors, under polymerization conditions, with a catalyst system comprising (i) a solid catalyst precursor consisting of a complex, which includes magnesium; titanium; a halogen which is chlorine, bromine, or iodine, or mixtures thereof; and, as an inside electron donor, a polycarboxylic acid ester containing two coplanar ester groups attached to adjacent carbon atoms; (ii) a trialkylaluinum cocatalyst; and (iii) an alkyltriakloxysilane or a dialkyldialkoxysilane;

(b) introducing into the reactor diisobutyl or diethyl phthalate, independent of the said complex, in an amount of about 50 to about 500 parts per million by weight based on one million parts by weight of polymer, said amount being sufficient to decrease the rate of polymerization; and (c) introducing into the reactor a trialkylaluminum cocatalyst in an amount of about 50 to about 500 parts by weight based on one million parts by weight of polymer, said amount being sufficient to increase the rate of polymerization.

26. The process defined in claim 25 wherein the amount of cocatalyst in step (c) is sufficient to essentially restore the initial rate of polymerization.

* * * * *